Nov. 17, 1942.　　　A. EHRINGHAUS　　　2,301,935
LENGTH MEASURING DEVICE
Filed Dec. 31, 1940
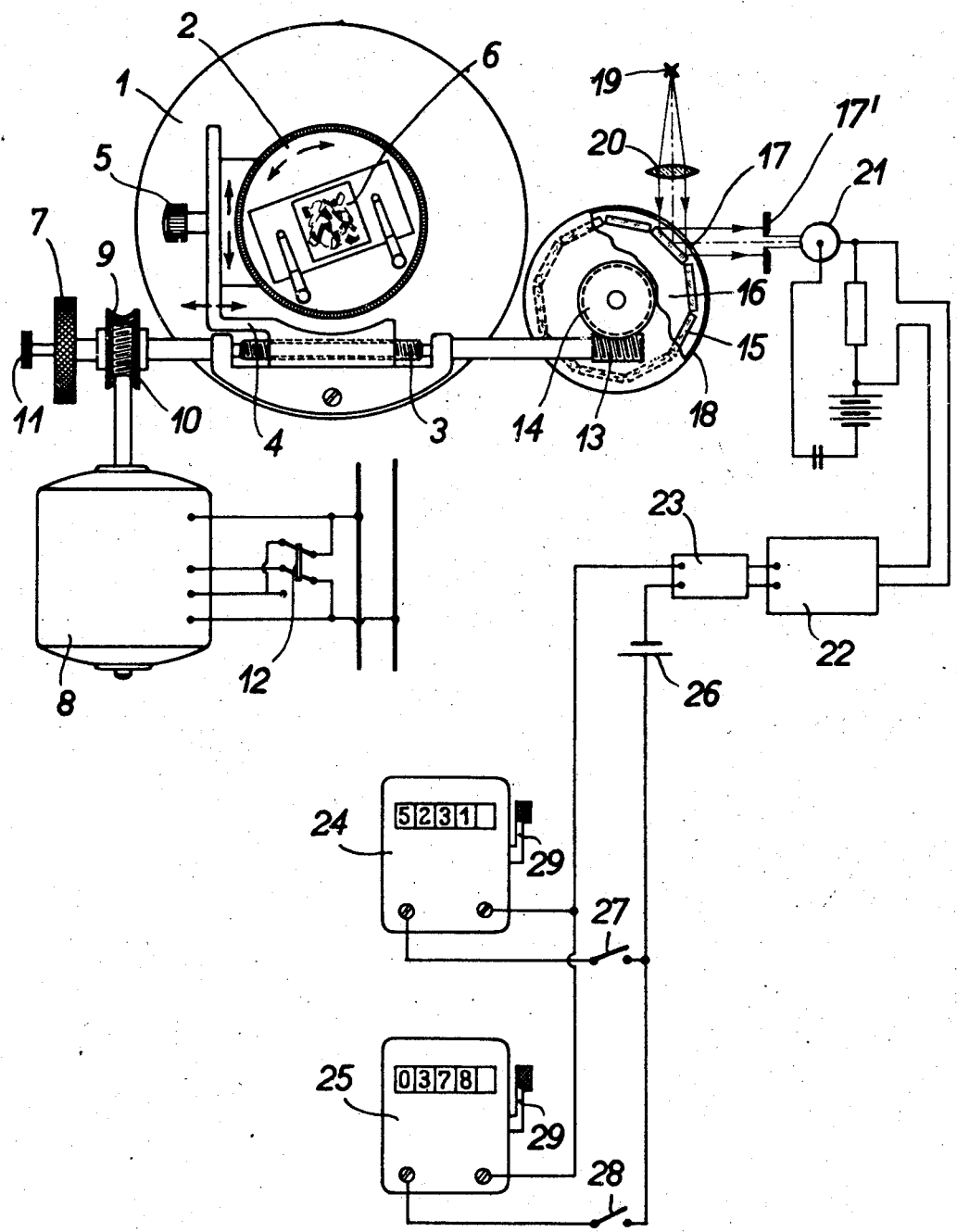
Inventor:
Arthur Ehringhaus.

Patented Nov. 17, 1942

2,301,935

UNITED STATES PATENT OFFICE 2,301,935

LENGTH MEASURING DEVICE

Arthur Ehringhaus, Gottingen, Germany; vested in the Alien Property Custodian

Application December 31, 1940, Serial No. 372,687
In Germany December 27, 1939

4 Claims. (Cl. 33—125)

The invention relates to a device for measuring a length by means of a movable measuring element acting upon a counter. Devices of this kind are employed in the quantitive determination of the constituents of mixtures, as rocks, ores or metals for instance, by measuring the length of the different constituents of the mixture. To this end either a transparent cut or a polished section of the object is produced, depending upon whether the investigation is to be carried out in transmitted or incident light, whereupon the object is passed under the cross lines of a microscope either in lines parallel to each other or in a spiral line. During this motion the lengths of the individual constituents of the mixture are measured and added up. The total of the lengths obtained of the different classes of constituents, are proportional to the quantities corresponding to such classes of constituents in the investigated material. In the known types of measuring devices the counters intended for the length-measurements are disposed at the side of the microscope separately from the displacing slide, and the motion of the object-stage of the microscope is mechanically or electrically transmitted to the counters. The mechanical coupling of the counter with the object-stage of the microscope is effected either by a flexible shaft or by means of rods connected by universal joints. These transmitting means have a drawback however in that they affect the movement of the object-slide and represent a charge on the motion device of the object-slide. In the case of the electrical coupling a contact device is used in the form of a collector which is mechanically connected with the driving shaft of the object-stage and with the aid of which current impulses are produced in the circuits of the electromagnetically controlled counters. However, said electrical coupling by means of a mechanical contact device inavoidably leads to an irregular sequence of contacts when in use for a length of time thus resulting in the current impulses failing to follow at regular intervals and rendering the readings inaccurate.

To eliminate these drawbacks the counter of the measuring device, according to the invention, is photoelectrically driven from the end of the measuring element. To generate the current impulses the measuring element is coupled, according to the invention, to an optical means so placed in the path of a pencil of light emitted by a light source and which acts upon a photo-sensitive cell, that said cell is intermittently exposed to light whenever the measuring element is moved, so that the counter connected to the cell is operated with the aid of the current impulses occurring in the circuit of the cell. As an optical means it will be possible to use those means which in cine-technics are employed as an optical compensation for film movements; in the present case a rotating reflector ring can be used in a specially advantageous manner.

To ensure that the counter responds reliably to the current impulses which are produced by the cell and which, expediently, are intensified by means of an amplifier, the current impulse is required to last a certain period of time. However, in order to exactly determine the time of such action on the part of the pencil of light rays a diaphragm is with advantage interposed into the light-path between the rotating reflector ring and the cell.

When using the invention in conjunction with microscopes the measuring element is represented in known manner by the driving spindle of the object-stage.

When using the invention in conjunction with a measuring device in the form of a micrometer screw the measuring spindle must be coupled to the optical means.

In the annexed drawing a constructional example of the invention is illustrated in plan view and partly in section when used in conjunction with a microscope.

On the object-stage 1 of a microscope an object holder 2 is displaceably disposed. The displacement is effected by means of a screw spindle 3 which is disposed on the object-stage and on which a guide arm 4 is mounted. On said guide arm the object holder 2 is mounted displaceable in a direction perpendicular to the axis of the screw spindle 3 by means of an adjusting head 5. No. 6 indicates an object which for the purpose of investigation is atached to the object holder 2. The object in question is a transparent cut of a rock to be investigated according to the aforementioned method, i. e., by measuring the lengths of the different constituents of the mixture on measuring lines lying parallel to each other and by subsequently adding the readings. By means of an adjusting head 7 seated on the screw spindle 3 the object holder 2 can be moved either by hand or with the aid of a D. C. motor 8 via a worm gearing 9, 10. When the screw spindle 3 is actuated by motor the worm gear 9, which is seated on said spindle and remains idle if the spindle is actuated by hand, must be imagined to be coupled to the spindle 3 by means of a drawing key of which, for the sake of better clearness, only the switching handle 11 is shown which is displaceable in the direction of the spindle axis. The direction of rotation of the motor 8 can be changed by reserving the direction of current in the armature with the aid of a change-over switch 12. By means of a worm gearing 13, 14 the screw spindle 3 actuates a reflector wheel 16 provided with ten reflectors 15, the reflector wheel being disposed in a housing 18 provided with an aperture 17. A pencil of light rays emitted by a light-source 19 and parallelly aligned by a collecting lens 20 is being reflected by a reflector of the reflector wheel 16 upon a photo-sensitive cell 21, as illustrated. Hence, when rotating the reflector wheel the pencil of rays reflected by each of the ten reflectors traverses the cell 21 and produces in the latter a current impulse corresponding to the light exposure. As the current impulses produced in the cell are not strong enough alone to immediately operate an electromagnetical counter mechanism the currents are intensified by a low-frequency amplifier 22 until they are capable of operating a relay 23 and via this relay by means of a battery 26 the counter mechanisms 24 and 25. In order that the current impulses produced in cell 21 and intensified by the amplifier 22 ensure a reliable response on the part of the counter mechanism the current impulse is required to last a certain length of time. To fix the time of exposure to the light-pencil a diaphragm 17' is interposed in the light-path between the reflector wheel 16 and the cell 21.

The pitch of the screw spindle 3 as well as the number of reflectors of the reflector wheel 16 and the gear ratio of the worm gearing 13, 14 must be so adjusted to each other that the counter mechanism indicates the longitudinal movement of the object holder in millimetres or in a fraction of a millimeter, as 0.01 or 0.001 of a millimeter, for instance.

One counter mechanism each is to be connected to the amplifier 22 for each constituent occasioned in the mixture under investigation. In the present case the device is equipped for the measuring of two constituents. Before measuring the length of a certain constituent the respective counter 24 or 25, respectively, must be switched in the relay circuit by means of a switch 27 or 28, respectively and remain within that circuit until the full length of the constituent has been traversed by the graticule of the microscope. The exposures to light and the consequent current impulses occurring entirely independent irrespective of whether the object holder moves from left to right or right to left, the counter mechanism keeps on counting in the original sense of the part-distances if the direction of movement is reversed, so that the second distance which runs parallel to the first can be measured from right to left when the first distance was measured from left to right. Where measurements are required to be made with a high degree of accuracy, it will be of advantage if each of the connected counting mechanisms are in known manner equipped with a turn-over gearing permitting of a return travel of the counter if the graticule has passed beyond the measuring distance of the respective constituent and must be brought back to the end of the measuring distance by moving the object backwards. For the sake of clearness only the switching lever 29 of the turn-over gearing is illustrated.

To bring the object 6, into such a position even with the motor 8 being coupled, where the different constituents of the mixture under investigation are in the best possible contrast to each other in polarised light between crossed Nicols, the object holder 2 has been disposed rotatably about an axis lying parallel to the axis of the microscope objective.

I claim:

1. A device for measuring lengths, comprising a body adapted to receive the object to be measured, means for displacing said body along a line, a drum rotatably mounted and composed of a plurality of reflectors disposed side by side, means for coupling said body and said drum so as to impart a rotation to the latter when said body is displaced, a light source emitting a pencil of light, a photoelectric cell, said pencil of light impinging said drum and being reflected intermittently by it to said photoelectric cell, a counter, electromagnetic means for actuating said counter, an amplifier operatively connected with said photoelectric cell and said electromagnetic means so as to actuate said counter by the impulses effected by said light pencil intermittently impinging said photoelectric cell.

2. In a device according to claim 1, a diaphragm interposed between said drum and said photoelectric cell.

3. A device for measuring lengths, comprising a microscope containing an object-stage displaceably disposed, means for displacing said object-stage, a light source emitting a pencil of light, a photoelectric cell exposed to said light pencil, an interrupting device operatively connected with said means for displacing said object-stage and interposed between said light source and said photoelectric cell for intermittently interrupting said light pencil, a counter, electromagnetic means for actuating said counter, and an amplifier operatively connected with said photoelectric cell and said electromagnetic means so as to actuate said counter by the impulses effected by said light pencil intermittently impinging said photoelectric cell.

4. A device for measuring lengths, comprising a microscope containing an object-stage displaceably disposed, means for displacing said object-stage, a drum rotatably mounted and composed of a plurality of reflectors disposed side by side, other means for coupling said means for displacing said object-stage and said drum so as to impart a rotation to the latter when said object-stage is displaced, a light source emitting a pencil of light, a photoelectric cell, said pencil of light impinging said drum and being reflected intermittently by it to said photoelectric cell, a counter, electromagnetic means for actuating said counter, and an amplifier operatively connected with said photoelectric cell and said electromagnetic means so as to actuate said counter by the impulses effected by said light pencil intermittently impinging said photoelectric cell.

ARTHUR EHRINGHAUS.